United States Patent [19]

Harrison

[11] Patent Number: 5,253,987
[45] Date of Patent: Oct. 19, 1993

[54] FLUID END FOR HIGH-PRESSURE FLUID PUMPS

[76] Inventor: Curtis W. Harrison, 7533 Kathy La., Fort Worth, Tex. 76126

[21] Appl. No.: 862,816

[22] Filed: Apr. 3, 1992

[51] Int. Cl.$^5$ ............................................ F04B 21/02
[52] U.S. Cl. ..................................... 417/566; 417/567; 417/571; 137/843; 137/543.21; 137/543.19
[58] Field of Search ............... 417/567, 571, 566, 454; 137/843, 540, 543.21, 543.19

[56] References Cited

U.S. PATENT DOCUMENTS

| | | | |
|---|---|---|---|
| 2,828,696 | 4/1958 | Wright | 417/567 |
| 3,052,445 | 9/1962 | Kessler | 251/309 |
| 3,260,217 | 7/1966 | Thresher | 417/567 |
| 3,309,013 | 3/1967 | Bauer | 230/231 |
| 3,372,648 | 3/1968 | Hammelmann | 417/567 |
| 3,457,949 | 8/1966 | Coulter | 137/543.21 |
| 4,174,194 | 11/1979 | Hammelmann | 417/567 |
| 4,551,077 | 11/1985 | Pacht | 417/454 |
| 4,757,974 | 7/1988 | Ward et al. | 251/356 |
| 4,878,815 | 11/1989 | Stachowiak | 417/63 |
| 5,037,276 | 8/1991 | Tremoulet, Jr. | 417/567 |
| 5,102,312 | 4/1992 | Harvey | 417/571 |

FOREIGN PATENT DOCUMENTS 127847  3/1927  Fed. Rep. of Germany ...... 417/567

Primary Examiner—Richard E. Gluck
Assistant Examiner—Roland G. McAndrews, Jr.
Attorney, Agent, or Firm—Robert A. Felsman

[57] ABSTRACT

A fluid end for use in high-pressure, reciprocating, fluid pumps has a cylinder with a bore therethrough in which a plunger reciprocates. A valve body is disposed at one end of the bore and includes suction valve seat and a discharge valve seat, which are substantially coaxial with the axis of the bore in the cylinder. The suction and discharge valves include elastomeric, abrasion-resistant seal members. The valve body is provided with at least one fluid flow passage positioned about the periphery of the suction valve seat to permit purging of entrapped gas from the pressure chamber defined in the cylinder bore between the plunger and the valve body. In a preferred embodiment of the present invention the suction and discharge valves are identical and interchangeable, and the valves are provided with urethane seal members to increase the abrasion resistance of the valves.

2 Claims, 3 Drawing Sheets

SECTION "A-A"

FLUID END FOR HIGH-PRESSURE FLUID PUMPS

BACKGROUND OF THE INVENTION

1. Field of the Invention

The present invention generally relates to high-pressure pumps for pumping incompressible fluids. More particularly, the present invention relates to the fluid-handling sections, or fluid ends, of such high-pressure fluid pumps.

2. Summary of the Prior Art

High-pressure, reciprocating, fluid pumps have been used for many years. Such pumps are employed to pressurize incompressible fluids to pressures upwards of 10,000 pounds per square inch (p.s.i.). A primary use of such pumps is in pumping drilling fluid, or mud, downhole during the drilling of oil wells. Such pumps also are used to provide pressurized fluid for applications such as water-blasting.

Because of the cyclic pressures (atmospheric to 10,000 p.s.i. and upward), and the frequently abrasive process fluid, the operating environment of such high-pressure pumps is very demanding. Therefore, much effort has been dedicated to designing a strong, durable, and easily maintained high-pressure, reciprocating, fluid pump. The high cyclical pressures encountered in such pumps makes pump components susceptible to fatigue failure. The presence of the process fluid, itself often corrosive, increases the susceptibility of pump components to fatigue failure through wet and corrosive fatigue. Many pump designs require crossbores, which intersect the pump cylinder, to deliver and carry away the process fluid. These intersecting crossbores create stress-concentrations, further rendering the pump susceptible to fatigue failure, and limiting the maximum pump pressure. Many known pumps require extremely high-strength materials to avoid the problem of fatigue failure. U.S. Pat. No. 3,260,217, Jul. 12, 1966, to Thresher, discloses a typical pump fluid end having intersecting crossbores.

Due to the abrasive nature of many of the process fluids (even tap water has a surprising amount of abrasive material suspended in it) abrasive wear of the valves and other components of the pump can be a significant problem. Most known pump designs use carefully machined and toleranced metal-to-metal suction and discharge valves. U.S. Pat. No. 5,037,276, Aug. 6, 1991, to Tremoulet, Jr., and U.S. Pat. No. 4,878,815, Nov. 5, 1989, to Stachowiak, are typical of such pumps having metal-to-metal valve assemblies. Such precision valves are expensive to manufacture and can be very difficult to replace in the field.

Because of high pump pressures, leakage from such pumps becomes a problem. Some known pumps use the pressure of the process fluid to hydrostatically bias the valve assembly in engagement with the cylinder. These pumps require extremely heavy discharge manifolds to contain the high pressure encountered. See U.S. Pat. No. 4,878,815, Nov. 7, 1989, to Stachowiak, for example. The weight and bulk of these discharge manifolds requires more than one person to remove the manifold for repair of the pump.

Cavitation, caused by gas entrapped in the pump fluid, can cause vibration and be very destructive to the pump. Therefore, such pumps must be designed to purge entrapped gas from the pressure chamber of the pump to minimize cavitation and the resulting destructive vibration.

It is, therefore, desirable to have a high-pressure, reciprocating, fluid pump that is strong, durable, easily and quickly repaired in the field, capable of pumping abrasive fluids, and easy and inexpensive to manufacture.

SUMMARY OF THE INVENTION

It is a general object of the present invention to provide an improved fluid end for use in high-pressure, reciprocating, fluid pumps.

This and other objects of the present invention are accomplished by providing a fluid end having a cylinder with a bore therethrough in which a plunger reciprocates. A valve body is disposed at one end of the bore and includes suction valve seat and a discharge valve seat, which are substantially coaxial with the axis of the bore in the cylinder. The suction and discharge valves include elastomeric, abrasion-resistant seal members. The valve body is provided with at least one fluid flow passage positioned about the periphery of the suction valve seat to permit purging of entrapped gas from the pressure chamber defined in the cylinder bore between the plunger and the valve body.

In a preferred embodiment of the present invention the suction and discharge valves are identical and interchangeable, and the valves are provided with urethane seal members to increase the abrasion resistance of the valves.

Other objects, features, and advantages of the present invention will become apparent with reference to the following drawings and detailed description.

DETAILED DESCRIPTION OF THE PREFERRED EMBODIMENT

Figure 1:
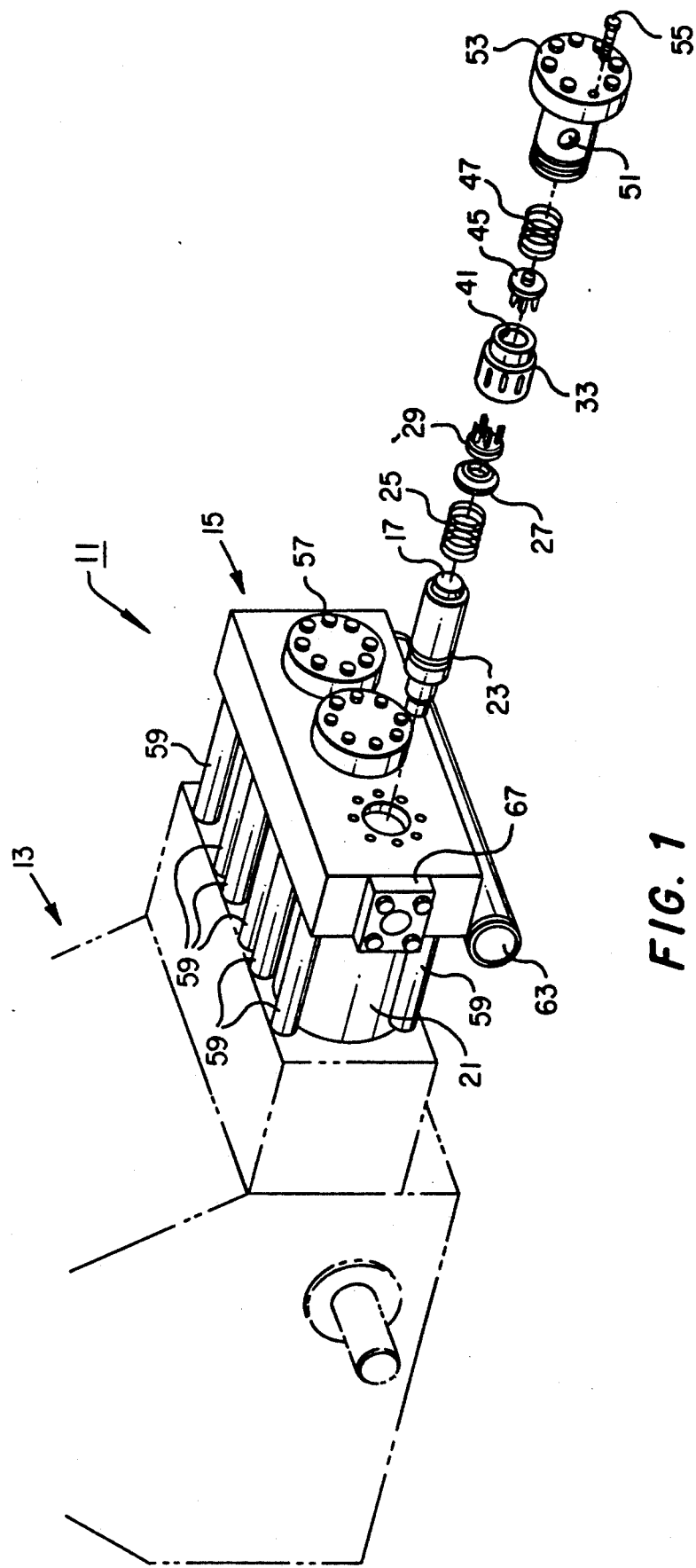
FIG. 1 is perspective view of a high-pressure, reciprocating, fluid pump including a fluid end according to the present invention; the power end of the pump is indicated in phantom lines.

With reference now to the figures, particularly FIG. 1, a typical, high-pressure, reciprocating fluid pump 11 is depicted. The pump comprises two portions, a power end 13, and a fluid end 15. The power end 13 is conventional and contains a crankshaft, connecting rods, and the various machinery required to reciprocate a plunger 17 within bore 19 of cylinder 21 of fluid end 15.

Major components of the fluid end 15 are cylinders 21, which may be individual cylinders or a single casting having several bores formed therein. Typical high-pressure, reciprocating fluid pumps have three or five cylinders 21. Such pumps are referred to as triplex or quintuplex pumps, respectively. Each cylinder 21 has a bore 19 therethrough, in which plunger 17 reciprocates to pressurize the process fluid. Cylinder 21 is covered at one end by manifold 57, which is affixed to power end 13 by means of threaded stay rods 59. Fluid end 15 also has a suction intake manifold 63 for delivery of the process fluid (not shown) to the pump cylinder 21. The process fluid is discharged from manifold discharge port 67 on discharge manifold 57.

Figure 2:
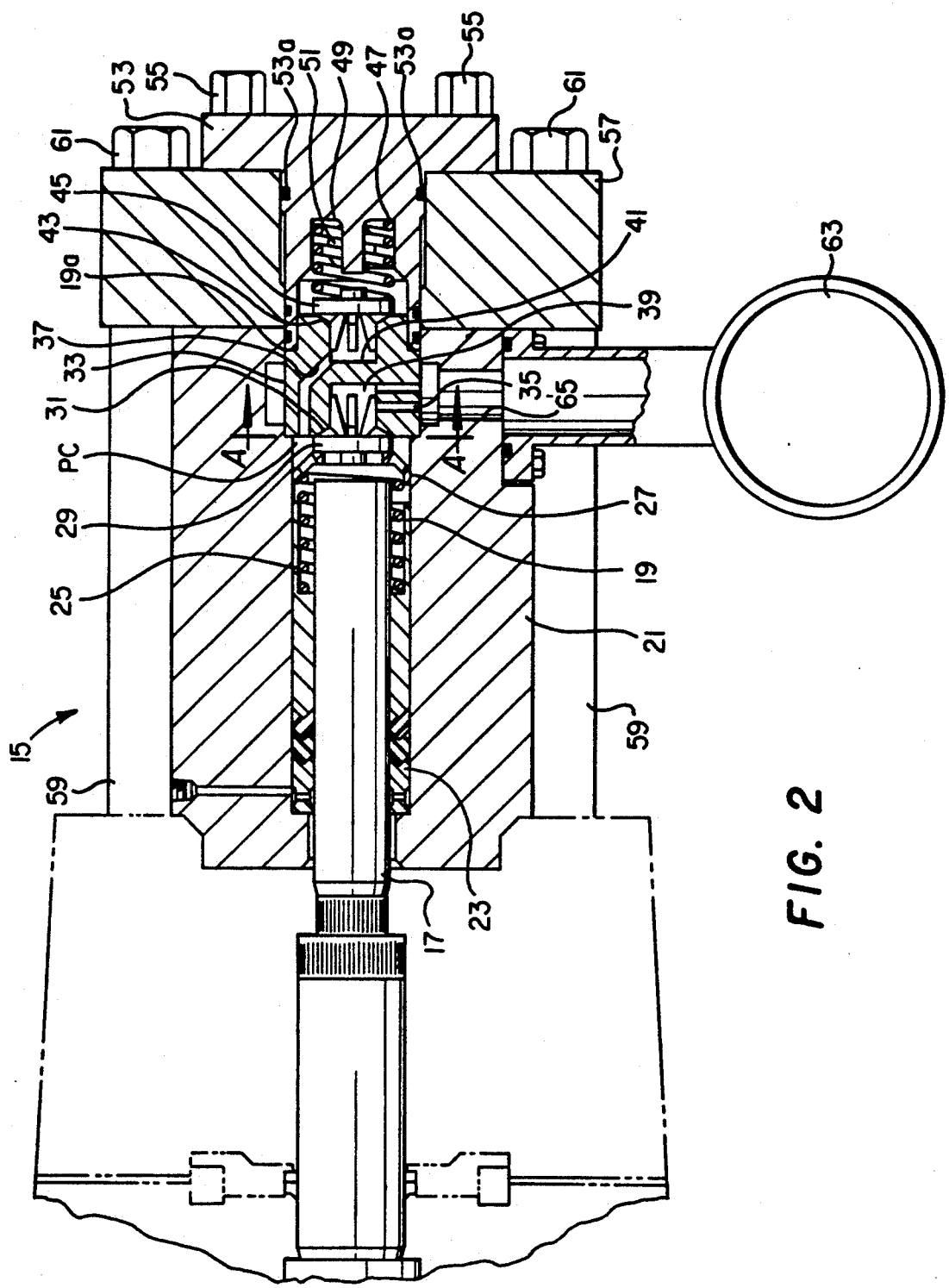
FIG. 2 is a longitudinal view, partially in section, of the valve body of the fluid end according to the present invention.

Referring now to FIG. 2, a fluid end according to the present invention is illustrated in longitudinal section. Fluid end 15 comprises a plunger 17 adapted for reciprocating motion in a cylindrical bore 19 formed in cylinder 21. Plunger 17 is aligned and sealed in bore 19 of cylinder 21 by packing 23. Packing 23 is conventional and serves to seal the process fluid from escaping past the plunger during operation.

Packing member 23 is retained and positioned within bore 19 of cylinder 21 by suction biasing member 25, in this case a coil spring. The suction biasing member serves the dual function of positioning and preloading packing member 23, as well as biasing suction valve 29 into a normally closed position through suction valve stop 27, which transmits biasing force from suction biasing member 25 to suction valve 29.

Suction valve 29 is seated in suction valve seat 31 of valve body 33. Valve body 33 is received in an enlarged portion 19a of bore 19 of cylinder 21. Valve body 33 is further provided with at least one suction fluid flow passage 35, and at least one discharge fluid flow passage 37. Suction fluid flow passages 35 are in fluid communication at one end thereof with suction intake manifold 63 and at an opposite end with suction valve receptacle 39. Suction fluid flow passages 35 permit fluid to enter the cylinder via suction valve 29 and suction valve seat 31.

Discharge fluid flow passages 37 are in fluid flow communication at one end thereof with pressure chamber PC, defined between plunger 17 and packing member 23, and valve body 33 and suction valve 27, and at an opposite end thereof with discharge valve receptacle 41. In a preferred embodiment of the present invention, at least one of the discharge fluid flow passages 37 is positioned at or near an uppermost point in pressure chamber PC. Positioning of discharge fluid flow passage 37 at or near an uppermost point of pressure chamber PC permits bubbles of entrapped gas in pressure chamber PC to float upward in the process fluid toward discharge fluid flow passage 37, thereby permitting rapid and efficient collection and discharge of entrapped bubbles from pressure chamber. This purging of entrapped gas prevents cavitation in the pump, which can result in extremely destructive vibration and component damage.

In a preferred embodiment of the present invention, another of discharge fluid flow passages 37 is positioned at or near a lowermost point in pressure chamber PC to permit collection and discharge of solid particles suspended in the process fluid. Discharge of solid material from pressure chamber PC prevents abrasive wear on pump components by those particles.

Disposed in discharge valve receptacle 41, and mating with discharge valve seat 43 of valve body 33, is discharge valve 47. The suction valve seat 31 and discharge valve seat 43 are substantially coaxially aligned with a longitudinal axis (not shown) of bore 19 of cylinder 21. The valve seats 31, 43 are aligned to conserve space and to eliminate need for stress-inducing cross-bores in the fluid end 15. Discharge valve 41 is maintained in a normally closed position by means of discharge valve biasing member 47, in this case a coil spring. Discharge valve biasing member 47 is received in discharge valve biasing member receptacle 49 in valve cover 53.

Valve cover 53 is received removably, by means of bolts 55, in discharge manifold 57. Valve cover 53 is provided with discharge port 51, which is in fluid communication with manifold discharge port 67 (shown in FIG. 1) in discharge manifold 57. Discharge manifold 57 is secured to cylinder 21 and power end 13 (shown in FIG. 1) by means of threaded stay rods 59 and nuts 61. Valve cover 53 is provided with conventional pressure-enhanced lip seals 53a to prevent leakage of process fluid from fluid end 15 without resort to interference fits or hydrostatic biasing of the valve body 31.

Figure 3:
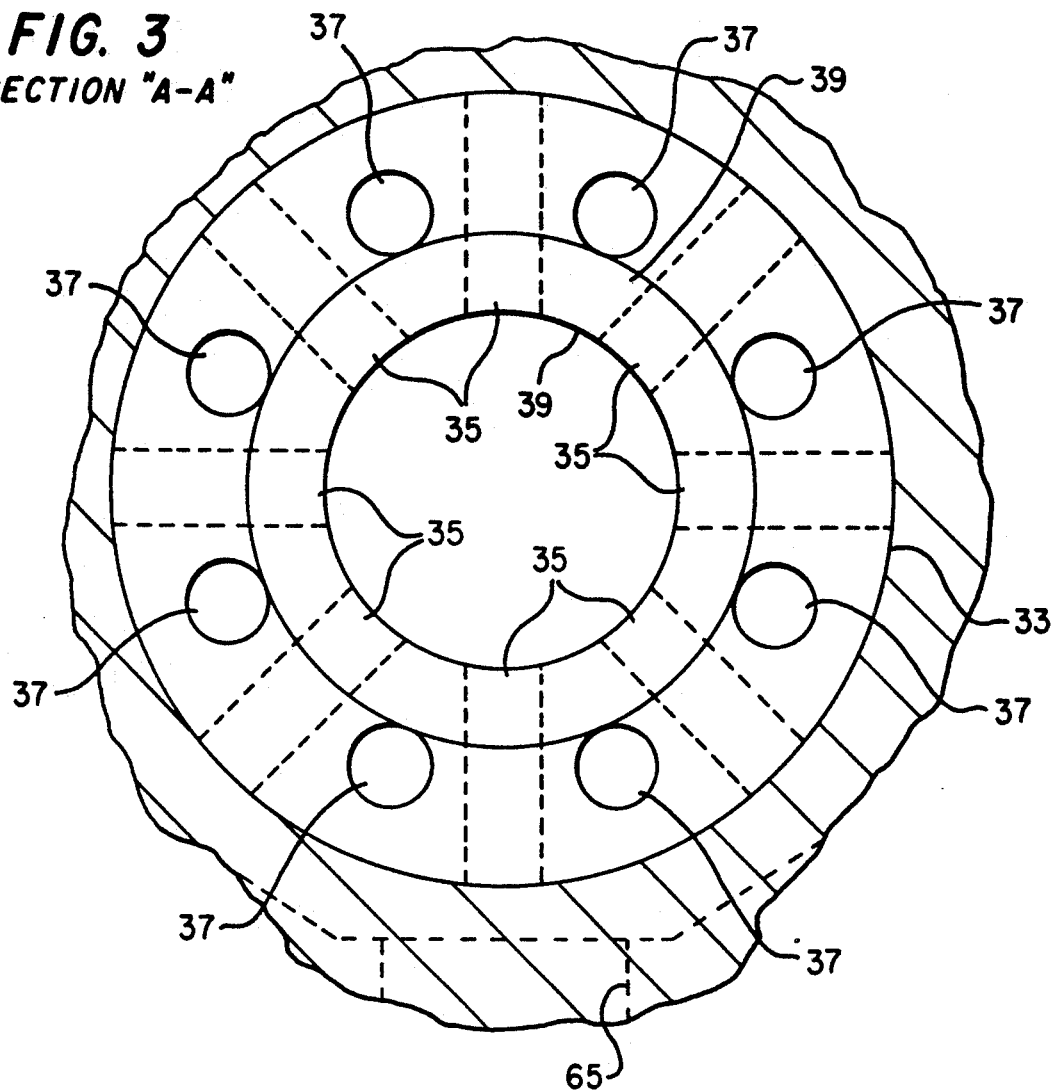
FIG. 3 is a fragmentary section view of the valve body of the fluid end according to the present invention, the section taken along line A—A of FIG. 2.

With reference now to FIG. 3, a fragmentary section view of valve body 33, taken along line A—A of FIG. 2, is illustrated. In a preferred embodiment of the present invention, valve body 33 has eight suction fluid flow passages 35 spaced circumferentially apart in valve body 33. The suction fluid flow passages are in fluid flow communication at one end with suction inlet passage 65, and at an opposite end with suction valve receptacle 39.

In a preferred embodiment of the invention, valve body 33 is further provided with eight discharge fluid flow passages 37. The discharge fluid flow passages are spaced circumferentially apart around the periphery of suction valve seat 31. Discharge fluid flow passages 37 are in fluid flow communication at one end of with pressure chamber PC, and at an opposite end with discharge valve receptacle 41. In a preferred embodiment of the invention, the uppermost discharge fluid flow passages serve to collect and discharge entrapped gas from the pressure chamber, thereby preventing cavitation and damage resulting therefrom. The two lowermost discharge fluid flow passages serve to collect and discharge solid particles suspended in the process fluid. Discharge of these particles prevents abrasive wear of the suction valve 29 and suction valve seat 31 of valve body 33.

Suction valve seat 31 comprises a conical surface circumferential to the suction valve receptacle 39. The suction valve seat 31 is adapted to matingly and sealingly engage the seal member (29b in FIG. 4) of suction valve 29. In a preferred embodiment of the present invention, the discharge valve seat 43 is substantially similar to the suction valve seat 31.

Figure 4:
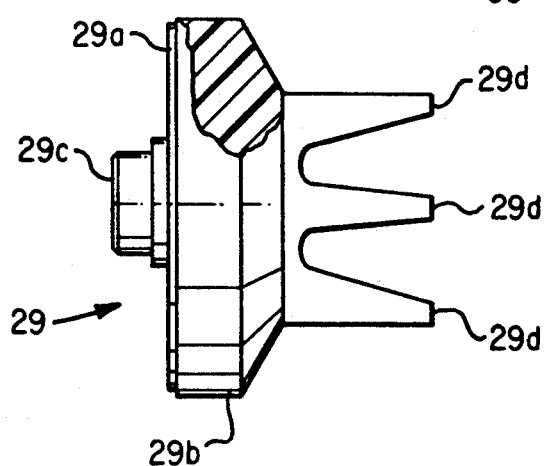
FIG. 4 is an enlarged elevation view of a valve for use with the fluid end of the present invention.

Referring now to FIG. 4, an abrasion-resistant valve 29 of the type contemplated for use in a preferred embodiment of the present invention is depicted. Valve 29 is conventional and is manufactured by Mission-TRW, Inc. and sold under the model name "Service Master II". In a preferred embodiment of the invention, valve 29 has a body 29a, a seal member 29b, a guide boss 29c, and four locating prongs 29d. Formed on body 29a of valve 29 is an elastomeric, abrasion-resistant seal member 29b. Guide boss 29c provides a means for locating valve 29 with respect to biasing member 47 or valve stop 27. Locating prongs 29d serve to locate the valve in its receptacle. Seal member 29b may be formed of conventional plastic, elastomer, or the like, with properties chosen for maximum abrasion-resistance and durability. In a preferred embodiment of the invention, seal member 29b comprises urethane plastic molded over valve body 29a. This material is found quite satisfactory when the process fluid is tap water. Also, in a preferred embodiment of the invention, the suction valve 29 and the discharge valve 45 are identical and interchangeable.

With reference to FIGS. 1 and 2, the operation of the pump fluid end according to the present invention will be discussed. Process fluid (not shown) enters fluid end 15 via suction manifold 63. Fluid is delivered from suction manifold 63 to valve body 33 by suction inlet 65 formed in cylinder 21. A rearward stroke of plunger 17 within cylinder 21 draws process fluid through suction fluid flow passages 35 in valve body 33, into suction valve receptacle 39, past suction valve 29 and suction valve seat 31, and into pressure chamber PC.

A forward stroke of plunger 17, combined with biasing force provided by suction biasing member 25, closes suction valve 29 on suction valve seat 31 of valve body 33. The forward stroke of plunger 17 performs work on the process fluid, pressurizing it to the desired pressure. Process fluid, as well as gas entrapped therein, and solid particles suspended therein, are discharged from pressure chamber PC through discharge fluid flow passages 37. As the pressurized process fluid collects in discharge valve receptacle 41, its pressure acting on discharge valve 45 overcomes the biasing force of discharge biasing member 47, thereby moving discharge valve 45 away from discharge valve seat 41. The pressurized process fluid then exits the fluid end 15 via discharge port 51 in valve cover 53. The pressurized process fluid exits discharge manifold 57 via discharge port 67. This process is repeated for every forward and rearward stroke of plunger 17. Three or five cylinders 21 are provided to maintain a larger volume and mass flow rate than could be accomplished with a single cylinder 21.

FIG. 1 illustrates the ease of disassembly and maintenance of the high-pressure fluid end 15 according to the present invention. Simply by removing the valve cover 53, easy access may be had to the discharge biasing member 47, discharge valve 45, valve body 33, suction valve 29, suction biasing member 25, plunger 17, and packing member 23.

The improved fluid end for use in high-pressure, reciprocating, fluid pumps according to the present invention has a number of advantages. One advantage of the present invention is the simplicity of the design. The relatively small number of parts reduces manufacturing cost and assembly time, resulting in an inexpensive fluid end. The simplicity and small number of parts also renders the fluid end according to the present invention easy to maintain. Interference fits between the valve body and cylinder bore are eliminated, thereby rendering removal of the valve body a simple, one-person task.

Another advantage of the present invention is that conventional, readily available, abrasion-resistant valves are used in the design. This eliminates expensive precision machining of valves, and permits easy and inexpensive replacement of the valves, which are among the first pump components to wear out.

Yet another advantage of the present invention is that stress-inducing crossbores are not exposed to cyclical process fluid pressure, thereby minimizing the susceptibility of the pump to fatigue failure. This advantage permits the fluid end according the present invention to be manufactured from lower-strength and lower cost materials.

Still another advantage of the present invention is that cavitation, and resulting pump damage, is avoided by the positioning of the discharge fluid flow passages wherein entrapped gas is purged or discharged from the pressure chamber in a rapid and efficient manner.

The invention has been described with reference to a preferred embodiment thereof. Those skilled in the art will realize that the invention is susceptible to variations and alterations without departing from the scope of the invention.

I claim:

1. A fluid end for use in a high-pressure, reciprocating, fluid pump including a power end having at least one reciprocating plunger extending therefrom, the fluid end comprising:
   a cylinder including a bore therethrough for receiving the reciprocating plunger, the bore having a longitudinal axis;
   a valve body disposed at one end of the bore, the valve body including a suction valve seat and a discharge valve seat, the suction valve seat and discharge valve seats in substantially coaxial alignment with the longitudinal axis of the bore;
   a suction valve including a rigid disk having a circumferential conical surface formed thereon, the circumferential conical surface having a layer of elastomeric, abrasion-resistant material formed thereon to matingly and sealingly engage the suction valve seat;
   a discharge valve formed substantially identically to and interchangeable with the suction valve;
   a discharge biasing member disposed for urging the suction valve into selective sealing engagement with the suction valve seat;
   a pressure chamber within the bore defined at one end of the bore by the valve body and at an opposite end by the reciprocating plunger and a packing member disposed within the bore;
   a suction biasing member disposed to abut the suction valve at one end of the suction biasing member and to abut a packing member disposed within the bore at an opposite end of the suction biasing member, wherein the suction biasing member urges the suction valve into selective sealing engagement with the suction valve seat and maintains the packing member in a selected position in the bore of the cylinder;
   at least one fluid flow passage disposed in the valve body about the periphery of the suction valve seat, the fluid flow passage in fluid communication at one end thereof with the pressure chamber and in fluid communication at an opposite end thereof with the discharge valve seat, a first of the fluid flow passages positioned within the valve body to collect and discharge gas bubbles from the pressure chamber, a second of the fluid flow passages positioned in the valve body to collect and discharge solid particles from the pressure chamber;
   a discharge manifold having at least one discharge passage in selective fluid communication with the fluid flow passages to selectively discharge fluid from the fluid end; and
   a valve cover removably attached to the discharge manifold to permit selective removal and confinement of the valve body within the fluid end.

2. The fluid end according to claim 1 wherein the elastomeric, abrasion-resistant material is urethane.

* * * * *